US005655994A

United States Patent [19]
Jang et al.

[11] Patent Number: 5,655,994
[45] Date of Patent: Aug. 12, 1997

[54] HYDRAULIC CONTROL SYSTEM OF AN AUTOMATIC TRANSMISSION FOR REDUCING A SHOCK OCCURING AT MANUAL SHIFTING

[75] Inventors: Jaeduk Jang; Kibeen Lim, both of Kyungki-do, Rep. of Korea

[73] Assignee: Hyundai Motor Company, Rep. of Korea

[21] Appl. No.: 554,709

[22] Filed: Nov. 7, 1995

[30] Foreign Application Priority Data

Nov. 9, 1994 [KR] Rep. of Korea ............... 94-29312
Nov. 9, 1994 [KR] Rep. of Korea ............... 94-29314

[51] Int. Cl.⁶ ........................... B60K 41/06; F16H 61/00
[52] U.S. Cl. ........................... 477/117; 477/131
[58] Field of Search ........................... 477/116, 117, 477/130, 131; 74/335

[56] References Cited

U.S. PATENT DOCUMENTS

| | | | |
|---|---|---|---|
| 4,495,838 | 1/1985 | Gooch | 477/116 |
| 4,519,273 | 5/1985 | Shimizu et al. | 477/117 X |
| 4,932,273 | 6/1990 | Arisumi | 477/116 X |
| 5,078,028 | 1/1992 | Ishikawa et al. | 477/117 X |
| 5,364,317 | 11/1994 | Amemiya | 477/116 X |
| 5,507,706 | 4/1996 | Jang et al. | |
| 5,537,887 | 7/1996 | Jang et al. | 477/131 X |

Primary Examiner—Rodney H. Bonck
Assistant Examiner—Saul J. Rodriguez
Attorney, Agent, or Firm—Finnegan, Henderson, Farabow, Garrett & Dunner, L.L.P.

[57] ABSTRACT

Disclosed is a hydraulic control system of an automatic transmission for a vehicle, which comprises an oil pressure regulating device for regulating the oil pressure of an oil pump, a manual/automatic shifting device for selecting a shifting mode, a pressure adjustment device for adjusting the hydraulic pressure to make a smooth shifting mode, a damper clutch control device for controlling the damper clutch of a torque converter, and a pressure distribution device for distributing the hydraulic pressure among the friction elements, wherein said pressure adjustment device further comprises an N-D control valve for supplying to the friction elements a duty-controlled hydraulic pressure produced by solenoid valves from the initial hydraulic pressure in the shifting from the neutral range to the drive range, said N-D control valve being switched to make the port change to provide the drive pressure, and a backward torque control regulator valve for making the port change by the duty-controlled hydraulic pressure in the shifting from the neutral range to the backward range so as to supply the backward pressure to the backward friction element.

8 Claims, 6 Drawing Sheets

HYDRAULIC CONTROL SYSTEM OF AN AUTOMATIC TRANSMISSION FOR REDUCING A SHOCK OCCURING AT MANUAL SHIFTING

BACKGROUND OF THE INVENTION

(1) Field of the Invention

The present invention concerns a hydraulic control system of an automatic transmission for vehicles, and more particularly means for reducing the shock when shifting from the neutral mode to the forward or backward mode.

(2) Description of the Prior Art

The automatic transmission comprises a torque converter, multi-stage gear shift mechanism connected with the torque converter, and a plurality of friction elements for selecting one of the gear shift stages. The friction elements are worked through a plurality of control valves for controlling the hydraulic pressure applied by the hydraulic control system.

Such a hydraulic control system comprises a pressure regulating means for regulating the hydraulic pressure produced by an oil pump, manual and automatic transmission control means for selecting one of the shift modes, pressure control means for controlling the shifting sense and responsiveness to make a gear shift smooth, damper clutch control means for working the damper clutch of the torque converter, and pressure distribution means for distributing properly the hydraulic pressure among the friction elements. The pressure control means controls the pressures applied to the friction elements, torque converter, solenoid valves, etc., which substantially affects the shifting sense.

When performing the shift operation, it is preferable to supply controlled hydraulic pressures to the friction elements while completing the shift operation with the drive pressure. Such transmission control means is disclosed in U.S. patent application No. 08/347,312 filed by the present applicant, which suffers the shift shock caused by the drive pressure or the backward pressure applied to the friction elements in the manual shifting when making the forward or the backward movement.

SUMMARY OF THE INVENTION

It is an object of the present invention to provide a control means for reducing the shifting shock in the manual shifting to be used in the hydraulic control system of an automatic transmission for a vehicle.

According to the present invention, a hydraulic control system of an automatic transmission for a vehicle, comprises an oil pressure regulating means for regulating the oil pressure of an oil pump, a manual/automatic shifting means for selecting a shifting mode, a pressure adjustment means for adjusting the hydraulic pressure to make a smooth shifting mode, a damper clutch control means for controlling the damper clutch of a torque converter, and a pressure distribution means for distributing the hydraulic pressure among the friction elements, wherein said pressure adjustment means further comprises an N-D control valve for supplying to the friction elements a duty-controlled hydraulic pressure produced by solenoid valves from the initial hydraulic pressure in the shifting from the neutral range to the drive range, said N-D control valve being switched to make the port change to provide the drive pressure, and a backward torque control regulator valve for making the port change by the duty-controlled hydraulic pressure in the shifting from the neutral range to the backward range so as to supply the backward pressure to the backward friction element.

The N-D valve preferably includes a first port for receiving the duty-controlled hydraulic pressure, a second port for receiving the drive pressure delivered by the manual valve, and a third port for sequentially supplying the hydraulic pressures of the first and second ports to the friction elements. More preferably provided in the N-D control valve is a fourth port, which receives the line pressure to make the port change so as to receive the hydraulic pressure controlled by the solenoid valves in the initial shifting. Moreover, the N-D control valve preferably includes a fifth port for receiving the duty-controlled hydraulic pressure as a control pressure.

The backward torque control regulator valve a first prot for receiving the duty-controlled hydraulic pressure, a third port for receiving the backward pressure, and a fourth port for supplying the backward pressure to the backward friction element.

The present invention will now be described more specifically with reference to the drawings attached only by way of example.

DETAILED DESCRIPTION OF THE PREFERRED EMBODIMENTS

Figure 1:
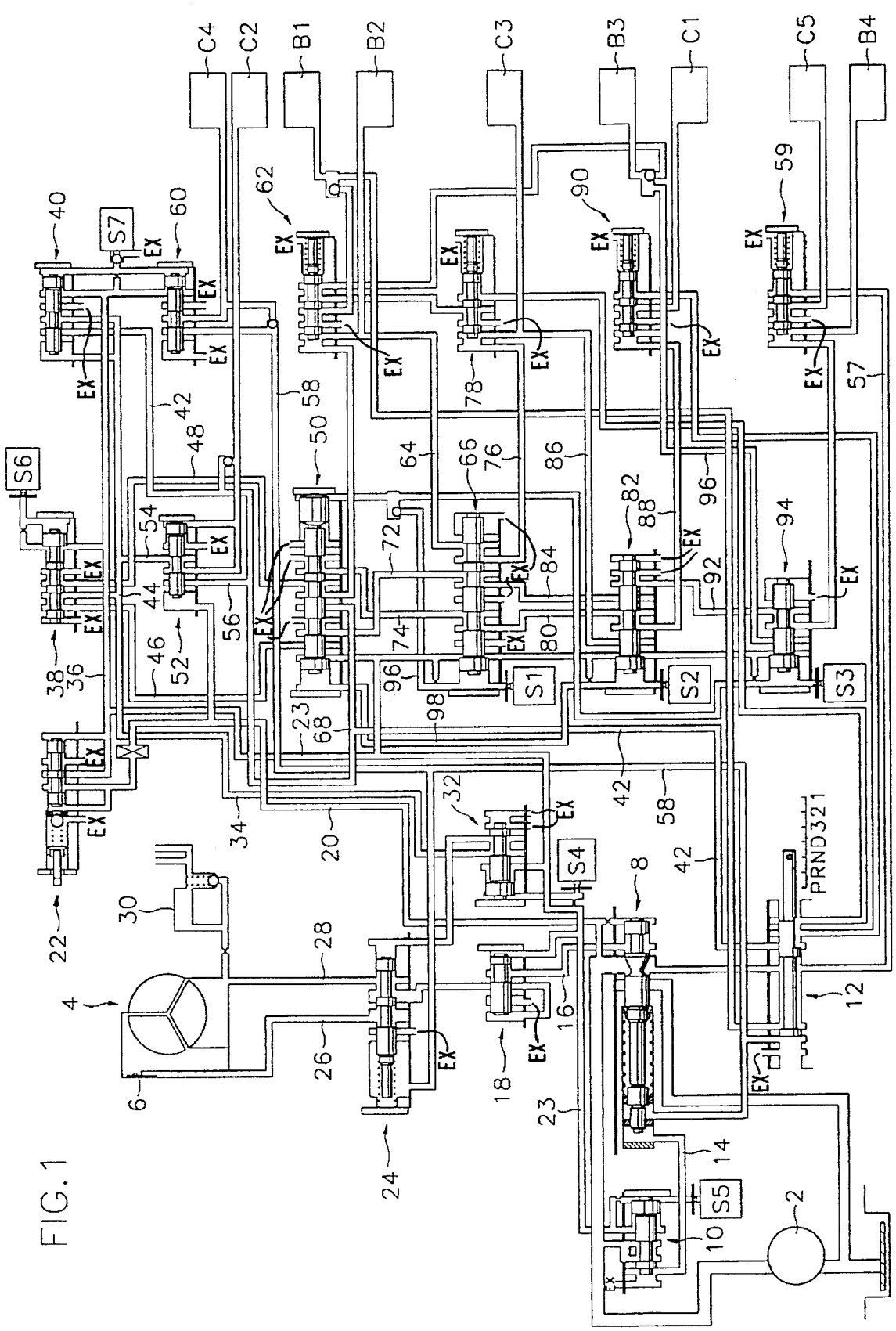
FIG. 1 shows a hydraulic circuit of a hydraulic control system according to a preferred embodiment of the invention.

An oil pump 2, torque converter 4, a damper clutch 6, and a pressure regulating valve 8 are shown.

The pressure regulating valve 8 can vary a line pressure in driving forward and rearward. The variance of the line pressure in driving forward is achieved through a high line signal valve 10 and the variance of the line pressure in driving rearward is achieved through a rearward pressure supplied from a manual valve 12. For this purpose, the presser regulating valve 8 is connected with the high line signal valve 10 through a passage 14 to be supplied a control pressure.

The line pressure varied by the pressure regulating valve 8 is fed to a converter feed valve 18 through a passage 16 and to a solenoid supply valve 22 through a passage 20.

The high line signal valve 10 can be controlled as it is connected with a passage 23, in which the pressure regulated by passing the pressure flowing the passage 20 through the solenoid supply valve 22 flows.

The converter feed valve 18 regulates the pressure to fit to the operation of the torque converter 4 and supplies the hydraulic pressure to the torque converter through a converter control valve 24. The converter control valve 24 supplies the pressure from the converter feed valve to a passage 26 or a passage 28 to operate or not to operate the damper clutch 6. The pressure flowing the passage 28 is supplied to a lubricating part through a cooler 30.

The control of the converter control valve 24 is accomplished through a converter control pressure signal valve 32 and the pressure in the passage 23 is used as a control pressure to operate the converter control pressure signal valve 32 for supplying or shutting the torque pressure flowing the passage 34 to the converter control valve 24.

The solenoid supply valve 22 regulates the pressure flowing in passage 20 to proper pressure (approximately 90 Psi) and then makes the pressure flow in a passage 36 for being used as a control pressure with respect to a control switch valve 38 and a torque control regulator valve 40.

The torque control regulator valve 40 changes the drive pressure supplied from the manual valve 12 through a passage 42 to a torque pressure and makes the torque pressure flow or shut to a passage 44. The torque pressure flowing in the passage 44 flows in a first torque pressure 46 or a second torque pressure passage 48 selectively via a control switch valve 38.

The first and second torque pressure passages 46 and 48 supply the torque pressure to a first to second shift valve 50 to carry out an automatic gear shifting, that means, the gear shifting is made at a time when a selecting lever is changed from neutral "N" range to driving "D" range, as a means for alleviating a shifting shock at this time, N-D control valve 52 is provided between the passage 44 in which the torque pressure flows and the driving pressure 42 flows, to connect them each other.

For the control of the N-D control valve 52, the N-D control valve 52 is supplied a control pressure from the passage 20 in which the line pressure flows and is connected with the passage 54 diverged from the passage 44 for the torque pressure being flowed into it during the shifting stage control procedure. The N-D control valve 52 is also connected with a passage 56 diverged from the passage 42, in which the driving pressure flows, for the driving pressure being supplied to a friction element after the torque pressure is supplied.

The N-D control valve can directly supply the hydraulic pressure to a first friction element (Ce) and also supply the hydraulic pressure to a second friction element (C5) by providing the hydraulic pressure to a over drive unit valve 59 through a passage 57 from the manual valve 12.

A rearward torque control regulator valve 60 is connected with a passage 58 for being supplied a rearward pressure from the manual valve 12 to provide the rearward pressure to a rearward friction element (C4) in case of the selecting lever being selected in reverse "R" range.

The rearward torque control regulator valve 60 has a passage connection to be supplied the control pressure of the torque control regulator valve 40.

The first to second shift valve 50 can supply the torque pressure to a third friction element (B2) through a second clutch valve 62 and a part of the torque pressure is supplied to a second to third shift valve 66 through a passage 64.

The torque pressure is changed to the driving pressure in the first to second shift valve 50 since the passage 42 in which the driving pressure flows is connected with the first to second shift valve 50 through a driving pressure-diverged passage 68 and, in the first to second shift valve 50, it is possible to perform port changes by means of a first solenoid valve (S1), on/off controlled by a transmission control unit (not shown).

The torque pressure of the first to second shift valve 50 is transferred to the second to third shift valve 66 through passages 72 and 74 at times when the torque pressure is changed to the driving pressure. At this time, one torque pressure is transferred to a third clutch valve 78 from the second to third shift valve 66 through a passage 76 and the other torque pressure is transferred to a third to fourth shift valve 82 through a passage 80. At times when the torque pressure flowing the passage 76 is changed to the driving pressure, the torque pressure supplied to the third clutch valve 78 is transferred to a third to four th shift valve 82 through a passage 84.

The torque pressure or driving pressure supplied to the third clutch valve 78 flows a passage 86 and a part of the pressure is supplied to a fourth friction element (C3) and another part of the pressure is supplied to the third to fourth shift valve 82.

The third to fourth shift valve 82 transfers the pressure from the passages 80 and 86 to a fourth band valve 90 through a passage 88 and transfers the pressure from another passage 84 to a fourth to fifth shift valve 94 through a passage 92.

The pressure supplied to the fourth band valve 90 is directly supplied to a fifth friction element (B3) and a part of the pressure is transferred to the fourth to fifth valve 94 via a passage 96. The pressure transferred to the fourth to fifth shift valve 94 through the passages 92 and 96 is through the over drive unit valve 59 supplied to a sixth friction element (B4).

The first to second, second to third, third to fourth, and fourth to fifth valves 50, 66, 82, and 94 can change the torque pressure or the driving pressure through the port changes accomplished by the solenoid valves S1, S2, and S3. That means, the first, second, and third solenoid valves S1, S2, and S3 exhaust the pressures supplied from the solenoid supply valve 22 and apply these pressures to lands having the largest area in the shift valves to move valve spools left side or right side.

For the port changes of the shift valves, the first to second shift valve is connected with the second to third shift valve via a control passage 96 and the first to second shift valve is connected with the third to fourth shift valve through a control passage 98.

Figure 2:
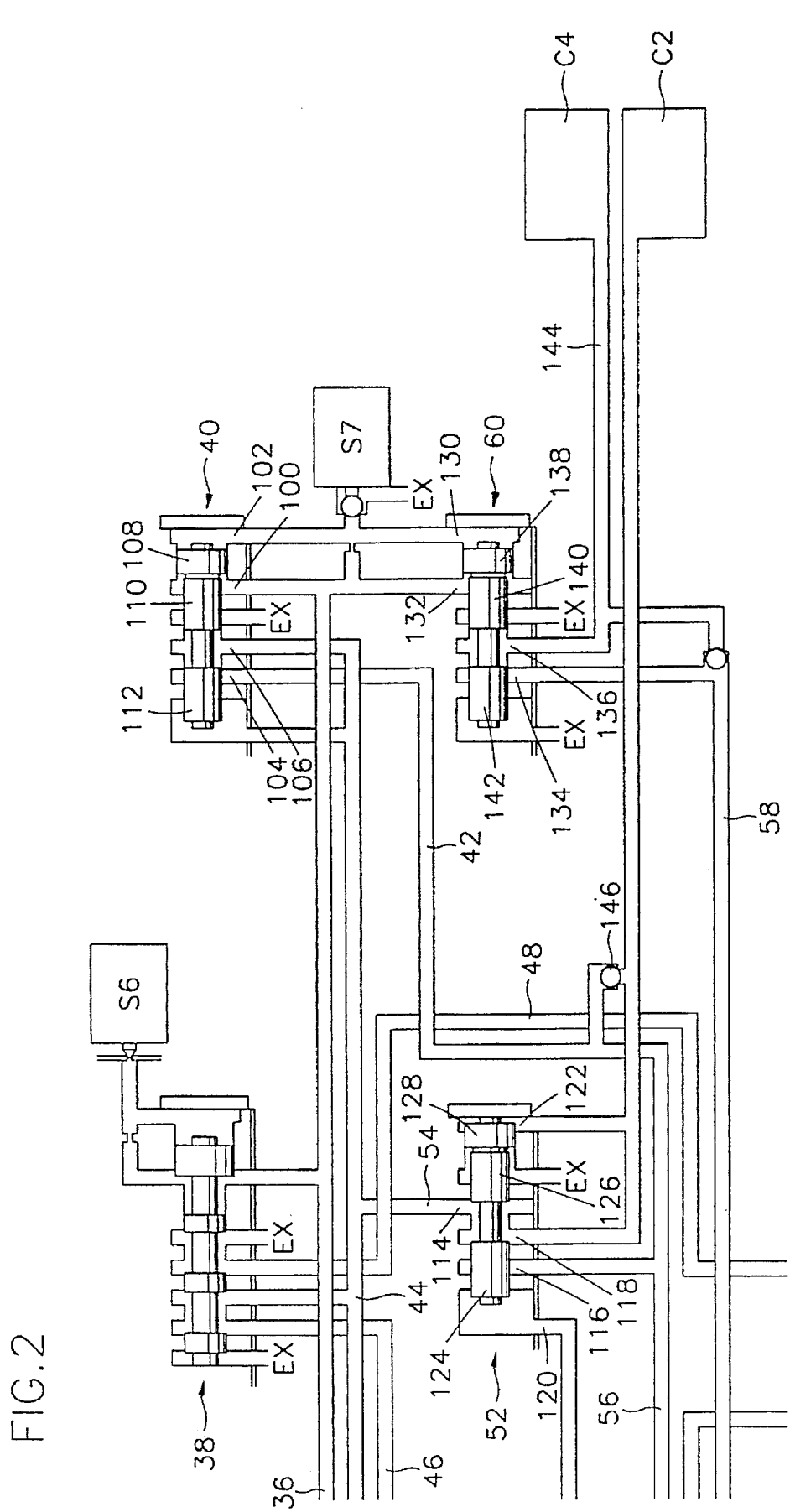
FIG. 2 is a enlarged view of a pressure regulating means and a damper clutch control means in FIG. 1.

FIG. 2 is a detail view showing hydraulic circuit for control unit at times of the gear-shifting.

The control switch valve 38 and the torque control regulator valve 40, which are supplied the control pressures from the solenoid supply valve 22 through the passage 36, transfer the torque presser to the N-D control valve 52 and the shift valves or can change the supplying passages,via a sixth and seventh solenoid valves each of which is controlled by a transmission control unit (TCU).

In the torque control regulator valve 40, the port change is made through the seventh solenoid valve (S7) which is duty controlled by the TCU and the seventh solenoid valve (S7)can apply or release a pressure at a second port 102 among a first port 100 and the second port 102. A third port 104 is communicated with the passage 42 in which the driving pressure flows for being supplied the pressure and a fourth port 106 is connected with the third port 104 to flow the pressure transferred from the third port 104 to the passage 44 as shown in FIG. 2.

A valve spool of the torque converter regulator valve 40 for opening or shutting the ports includes a first land 108, both sides of which is applied the pressure flowed from the first port 100 and the second port 102 and having the largest pressure-applied sides, a second land 110 having smaller sides than that of the first land 108 for exhausting or obstructing the torque pressure flowing the passage 44, and a third land 112 for opening or shutting the third port 104, having smaller sides than that of the second land 110.

The N-D control valve 52 supplied the torque pressure through the torque pressure diverged passage 56 from the passage 44 includes a first port 114 to which the torque pressure is supplied, a second port 116 to which the driving pressure is supplied through the passage 42 and a third port 118 for providing the torque pressure or driving pressure from the first and second ports to the friction element (C2) selectively.

Also, the N-D control valve 52 includes a fourth port 120 for being supplied the line pressure from the passage 20 in which the line pressure flows and a fifth port 122 from which the pressure is applied to the friction element (C2) with the pressure from the third port 118.

This N-D control valve 52 is provided to alleviate a shock occurring at times when the operation range is changed from the neutral "N" to driving "D" and the valve spool of which includes a first land 124 for opening or shutting the second port 116 by the control pressure flowed into the fourth port 120, a second land 126 for opening or shutting the first port 114, and a third land 128 in which the pressure from the fifth port 122 is applied and the pressure-applied area is larger than that of the first and second lands.

The rearward torque control regulator valve 60 for alleviating a shock occurring at times when the operation range is changed from neutral "N" to driving "D" includes a first port 130 in which the hydraulic pressure is formed or released by the duty control of the seventh solenoid valve (S7), a second port 132 for being supplied the presser from the passage 36 (the port 100 of the torque control regulator valve 40 is also supplied the pressure from the passage 36), a third port 134 for being provided the rearward pressure through the passage 58 from the manual valve 12, and a fourth port 136 for supplying the rearward pressure flowed to the third port into the rearward friction element (C4).

The valve spool of the rearward torque control regulator valve 60 includes a first land 138 having the largest pressure-applied area in which the hydraulic pressure of the first port 130 is applied, a second land 140 for exhausting or obstructing the rearward pressure supplied to the rearward friction element and a third port 142 for opening or shutting the third port 134.

The passage 42 for supplying the driving pressure is communicated with the passage 144 for supplying the rearward pressure to the rearward friction element (C4) and there is a check valve 146 in the connection part of the passages.

In neutral "N" range, the pressure from the manual valve 12 is directly supplied to the friction element (B1) and the friction element operates. (refer to FIG. 1) And the line pressure flowing the passage 20 from the pressure regulating valve 8 is supplied to the fourth port 120 of the N-D valve 52 to hold the state in which the valve spool is moved to right.

At this state, if the mode is changed to the rearward range, since the friction element (B1) already operates in neutral "N" range, there is only need to supply the pressure to the rearward friction element (C4) and this is achieved by the off control of the seventh solenoid valve (S7). That means, if the seventh solenoid valve (S7) is off controlled, the pressure is formed in the first port 130 of the rearward torque control regulator valve 60 and the valve spool is moved to left to communicate the third port 134 with the fourth port 136.

Accordingly, the rearward pressure stayed in the third port 134 is provided to the rearward friction element (C4) through the third and fourth ports 134 and 136.

Since the friction element (B1) is held in neutral "N" range, it is easy to control.

If the mode is changed from neutral "N" range to driving "D" range, the operating pressure supplied to the friction element (B1) in neutral range is exhausted and the driving pressure will stay in the second port 116 of the N-D valve. At the same time, the duty pressure which is duty controlled by the seventh solenoid valve (S7) is flowed to the first port 114 of the N-D valve 52 and is supplied to the friction element (C2) through the third port 118. The pressure supplied to the friction element (C2) flows to the fifth port 122 of the N-D valve 52 and moves the valve spool thereof to left.

As a result, the third port 118 which communicate with the first port 114 is obstructed and the second port 116 is communicated with the third port 118. Therefore, the drive pressure which stayed in the second port 116 is supplied to the friction element (C2) and the gear ratio-shifting is completed.

Figure 3:
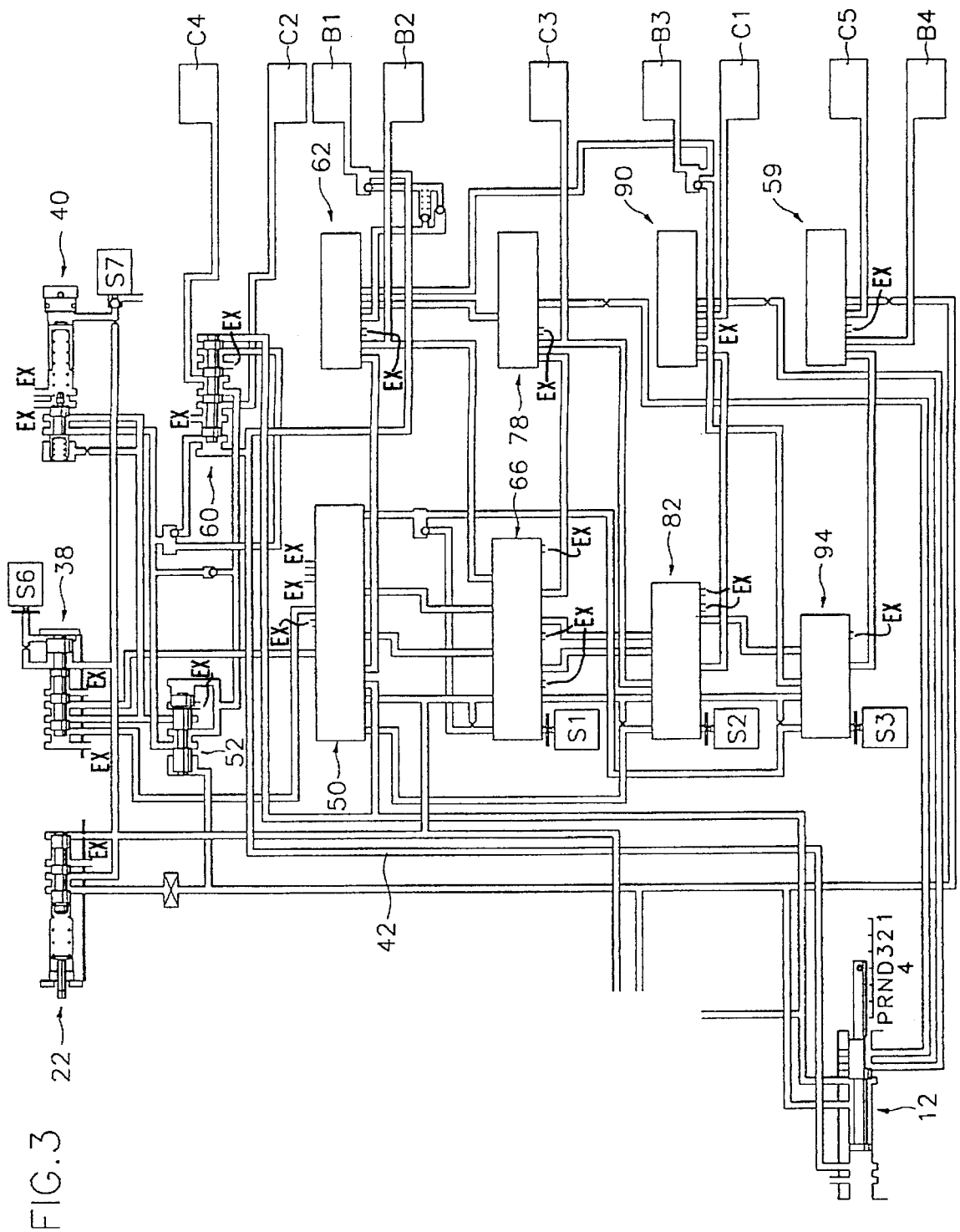
FIG. 3 shows a hydraulic circuit of a hydraulic control system according to another preferred embodiment of the invention.

FIG. 3 shows hydraulic control system according to another preferred embodiment of the invention.

The shift valves 50, 66, 82, and 94, the second clutch valve 62, the third clutch valve 78, the fourth band valve 90, the over drive unit valve 59 and their connection in the first preferred embodiment of the invention are available in this embodiment. The means for regulating the hydraulic pressure coming from the oil pump 2 and the means for providing the pressure to the torque converter 4 are available, too.

Accordingly, the description regarding the part having the above element will be omitted and description will be focused on the means for alleviating a shock occurring at times of gear-shifting, which is a main issue of the invention.

The means for alleviating a shock occurring at times of gear-shifting includes a solenoid supply valve 22 for reducing the line pressure and supplying it, a control switch valve 38 for supplying a torque pressure to operate a friction element by a first torque pressure, and a torque control regulator valve 40 for supplying a pressure for operating the friction element to the control switch valve 38.

Figure 4:
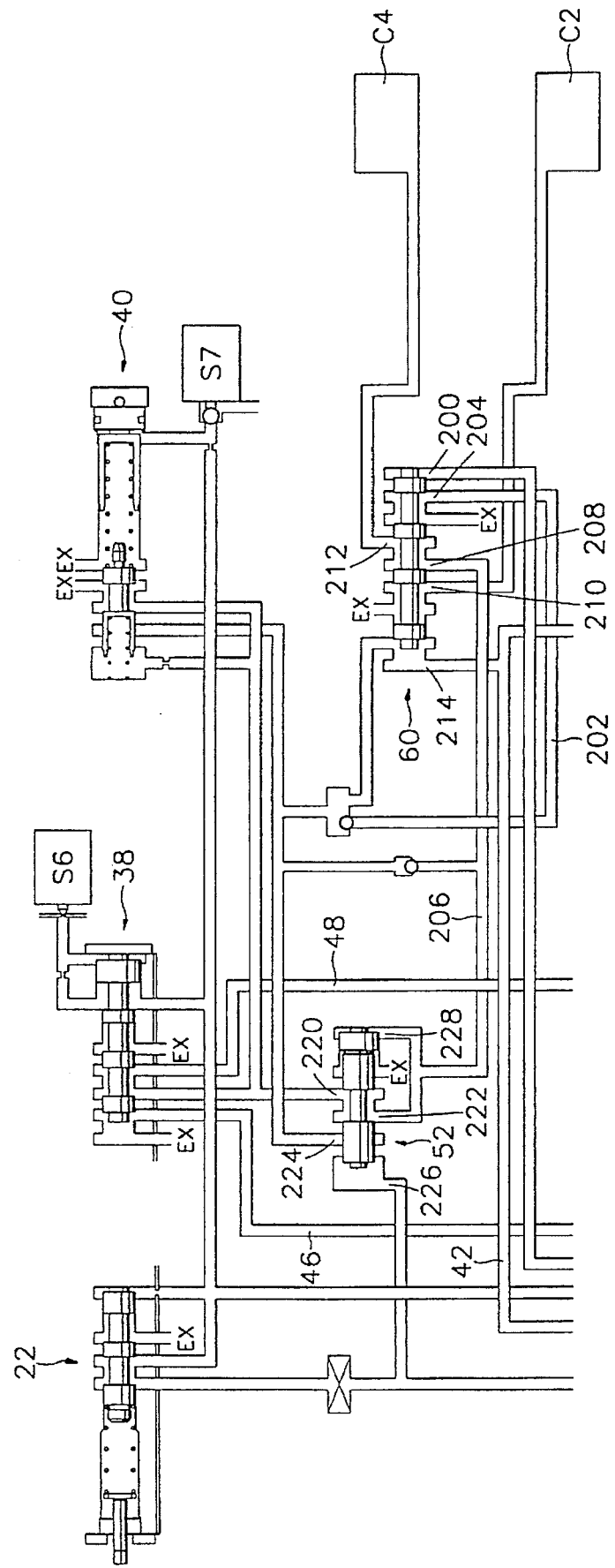
FIG. 4 is an enlarged view of a means for alleviating a shock occurring during a gear shift in accordance with the invention.

FIG. 4 is a enlarged view of the means for alleviating a shock occurring at times of gear-shifting and a rearward torque control regulator valve 60 includes a first port 200 connected to a passage 42 supplied a driving pressure and a second port 204 supplying the pressure flowed to the first port 200 to the torque control regulator valve 40, a N-D valve 52 through a passage 202, a third port 208 supplied the pressure coming from the N-D valve 52 through a passage 206, and a fourth and fifth ports 210 and 212 supplying the pressure flowed to the third port to friction element (C2) or rearward friction element (C4). And it also includes a sixth port 214 supplying a control pressure to move the valve spool for flowing the pressure form the third port 208 to the fourth port 210 or the fifth port 212, to which the pressure from a manual valve 12 through a passage 42 is supplied.

The N-D valve 52, which is supplied the regulated pressure from the torque control regulator valve 40 through a passage 44, includes a first port 220 connected with the passage 44, a second port 222 for supplying the pressure flowed to the first port 220 to a passage 206, a third port 224 supplying the drive pressure to the second port, a fourth port 226 connected with a passage 20 for controlling the valve spool by the line pressure, and a fifth port 228 in which the pressure from the second port is also applied.

A first torque pressure passage 46 and a second torque pressure passage , each of which comes from the control switch valve 38, are connected to a first to second shift valve 50.

Figure 5:
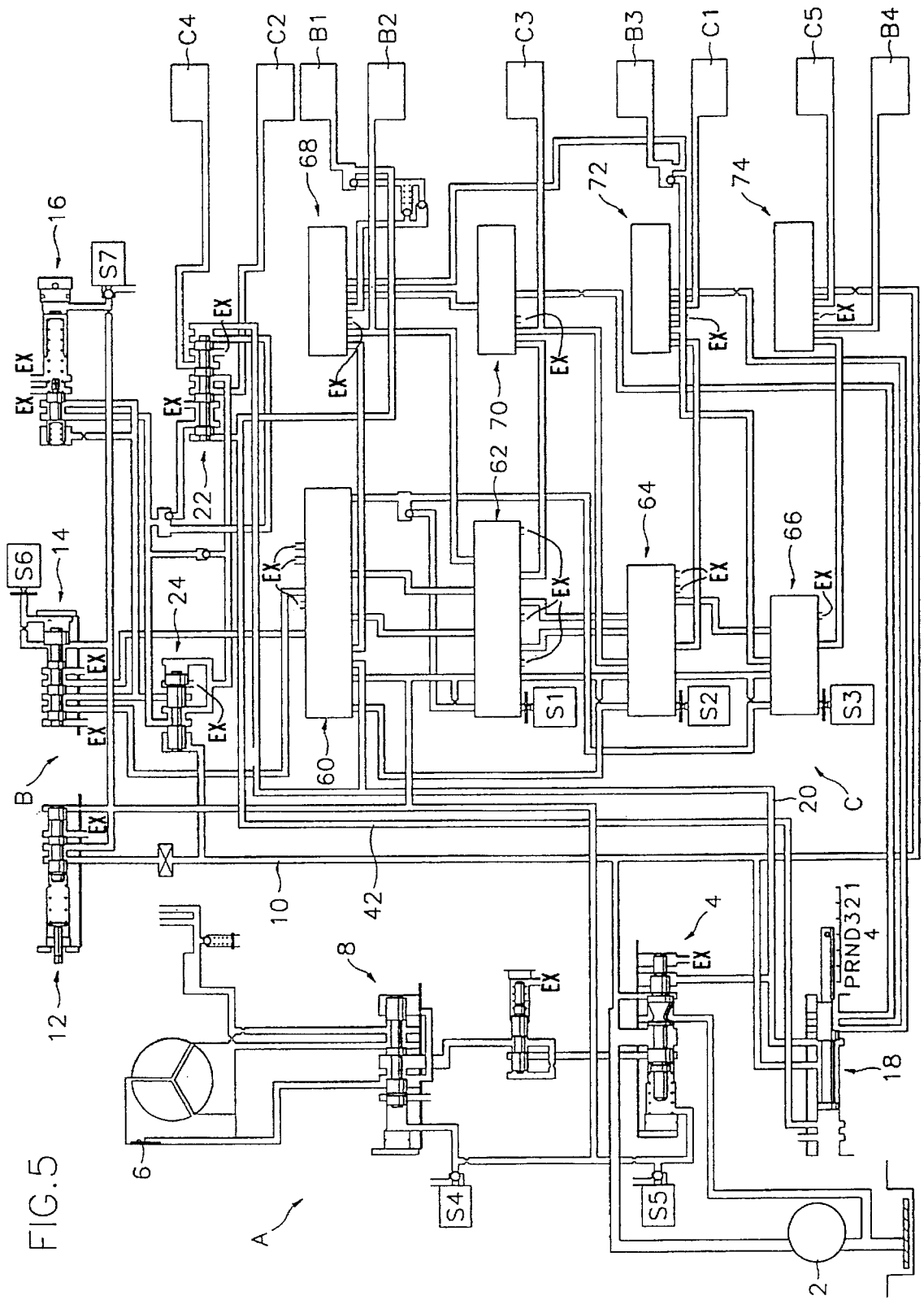
FIG. 5 shows the hydraulic circuit with the select lever shifted from the neutral range to the driving range.

As shown in FIG. 5, if the select lever is shifted from the neutral range to driving range, the drive pressure is provided to the first port 200 of the rearward torque control regulator valve 60 from the manual valve 12 via a passage 20.

At this time, the pressure flowed to the first port 200 is applied to the right side of a land L1 to move the valve spool left and the pressure flows from the first port 200 to second port 204 for being supplied to the torque control regulator valve 40 via the passage 202. At this time a part of the pressure stays in the third port 224 of the N-D valve 52.

The torque pressure which passes the torque control regulator valve 40 flows through the passage 44 to the first ports of the control switch valve 38 and the N-D valve 52. Since the first port 220 of the N-D valve 52 is connected to the second port 222, the pressure coming out the second port flows to the third port 208 of the rearward torque control regulator valve 60 through the passage 206 and, at this state, the third port is connected with the fourth port 210, therefore the torque pressure is supplied to forward friction element (C2) and gear ratio shifting to first speed stage is started.

Then the toque pressure is flowed to the fifth port 28 of the N-D valve 52 and it is applied to the right side of the right land having the largest pressure-applied side to move the valve spool left. As a result, the first port 220 is disconnected with the second port 222 and the second port 222 is connected with the third port 224. The drive pressure staying in the third port 224 flows through the second port 222 to the passage 206 and it is supplied to the forward friction element (C2) via the third port 208 and the fourth port 210 of the rearward torque control regulating valve. Then the first speed stage control is completed.

Figure 6:
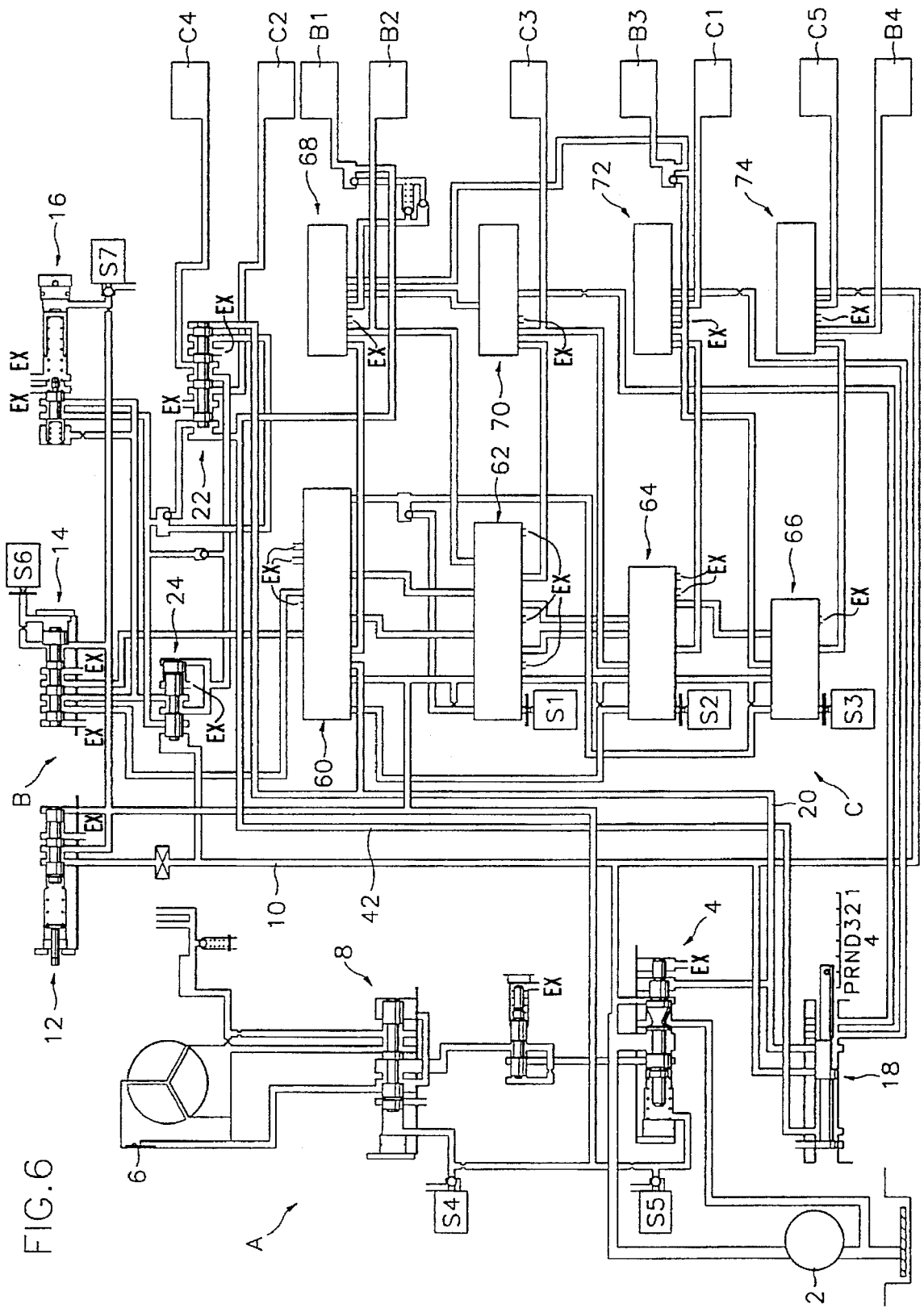
FIG. 6 shows the hydraulic circuit with the select lever shifted from the neutral range to the reverse range.

As shown in FIG. 6, if the select lever is shifted from the neutral range to a reverse range, the drive pressure is provided to the sixth port 214 of the rearward torque control regulator valve 60 from the manual valve 12 via a passage 42.

This pressure is applied to a left land of the rearward torque control regulator valve 60 to move the valve spool right.

As a result, the pressure flowed into the sixth port 214 is provided to the torque control regulator valve 40 through a shuttle valve S and a part of the pressure stays in the third port 224 of the N-D valve. And the pressure supplied to the torque control regulator valve is converted to the torque pressure for being supplied to the control switch valve 38 via the passage 44 and a part of the pressure is supplied to the first port 220 of the N-D valve 52.

The pressure in the passage 42 is provided to the friction element (B2) and the pressure flowed to the first port 220 of the N-D valve 52 is through the second port 22 to the third port 208 of the rearward torque control regulator valve 60 since the valve spool of the N-D valve is moved to right by the line pressure.

The valve spool of the rearward torque control regualtor valve is moved to right by the pressure flowed to the sixth port 214 and the third port 208 is connected to the fifth port 212, accordingly, the torque pressure is supplied to the rearward friction element C4 and rearward control is begun.

As the rearward friction element C4 works, a part of the working pressure is supplied to the fifth port 22 of the N-D valve 52 to move the valve spool to left and the third port 224 is connected to the second port 222.

Consequently, as the rearward pressure staying in the third port 224 flows to the passage 206 through the second port 222, the torque pressure is changed to the reward pressure to operate the rearward friction element C4.

If the manual shifting occures from the forward driving range or rearward driving range to the neutral(N) range, no hydraulic pressure is supplied from the manual valve 12 to the drive pressure passage 20 or to the rearward pressure passage 42 and the pressure is released quickly through the check valve C provided in the passage 206 used in common for the forward driving and the rearward driving.

As described in above, therefore, the invention provides a manual shifting control unit of hydraulic control system for the vehicles which can make the constitution of the hydraulic control system compact and smoothen the manual shifting.

What is claimed is:

1. A hydraulic control system of an automatic transmission for a vehicle, comprising an oil pressure regulating means for regulating the oil pressure of an oil pump, a shifting means for selecting a shifting mode, a pressure adjustment means for adjusting the hydraulic pressure to make a smooth shifting mode, a damper clutch control means for controlling a damper clutch of a torque converter, and a pressure distribution means for distributing the hydraulic pressure among friction elements, wherein said pressure adjustment means further comprises an N-D control valve for supplying to said friction elements a duty-controlled hydraulic pressure produced by solenoid valves from the initial hydraulic pressure in shifting from a neutral range to a drive range, said N-D control valve being switched to make a port change to provide the drive pressure, and a backward torque control regulator valve for making the port change by said duty-controlled hydraulic pressure in the shifting from the neutral range to a backward range so as to supply the backward pressure to a backward friction element;

wherein said N-D valve includes a first port for receiving the duty-controlled hydraulic pressure, a second port for receiving the drive pressure delivered by a manual valve, and a third port for sequentially supplying the hydraulic pressures of said first and second ports to the friction elements;

and wherein said N-D control valve is provided with a fourth port for receiving the line pressure to make the port change so as to receive the hydraulic pressure controlled by said solenoid valves in the initial shifting.

2. A hydraulic control system as defined in claim 1, wherein said N-D control valve further includes a fifth port for receiving said duty-controlled hydraulic pressure as a control pressure.

3. A hydraulic control system as defined in claim 1, wherein said backward torque control regulator valve includes a port for receiving said duty-controlled hydraulic pressure, a port for receiving the backward pressure, and a port for supplying the backward pressure to the backward friction element.

4. A hydraulic control system of an automatic transmission for a vehicle, comprising an oil pressure regulating means for regulating the oil pressure of an oil pump, a shifting means for selecting a shifting mode, a pressure adjustment means for adjusting the hydraulic pressure to make a smooth shifting mode, a damper clutch control means for controlling a damper clutch of a torque converter, and a pressure distribution means for distributing the hydraulic pressure among friction elements, wherein said pressure adjustment means further comprises a backward torque control regulator valve provided in the line for receiving the drive pressure from a manual valve, and an N-D control valve for supplying the torque pressure of a torque control regulator valve to a backward friction element, whereby said N-D control valve makes a port change controlling the initial hydraulic pressure in the manual shifting from a neutral range to a forward or a backward range;

wherein said N-D control valve includes a port to be controlled by the line pressure.

5. A hydraulic control system as defined in claim 4, wherein said backward torque control regulator valve includes a first port for receiving the drive pressure, a second port for supplying of said first port to said torque control regulator valve, and a third port for supplying the drive pressure to a plurality of friction elements.

6. A hydraulic control system as defined in claim 4, wherein said N-D control valve includes a first port for receiving the torque pressure, a second port for supplying the hydraulic pressure of the first port to said backward torque control regulator valve, and a third port for reserving said drive or backward pressure in working of said torque pressure.

7. A hydraulic control system as defined in claim 4, wherein a shuttle valve is provided between said backward torque control regulator valve and said torque control regulator valve.

8. A hydraulic control system as defined in claim 4, wherein a check valve is provided between said backward torque control regulator valve and said N-D control valve.

* * * * *